(12) United States Patent
Guerrieri et al.

(10) Patent No.: US 8,542,754 B2
(45) Date of Patent: Sep. 24, 2013

(54) METHOD OF TRANSMITTING A PACKET OF DIGITAL DATA OVER A POLY-PHASE POWER LINE AFFECTED BY IMPULSIVE NOISE

(75) Inventors: Lorenzo Guerrieri, Aosta (IT); Emile Saccani, Aosta (IT); Alessandro Lasciandare, Saint Christophe (IT); Arturo Lotito, Bergamo (IT); Paola Bisaglia, Padua (IT)

(73) Assignees: Dora S.p.A., Aosta (IT); STMicroelectronics S.R.L., Agrate Brianza (MB) (IT)

( * ) Notice: Subject to any disclaimer, the term of this patent is extended or adjusted under 35 U.S.C. 154(b) by 270 days.

(21) Appl. No.: 12/828,684

(22) Filed: Jul. 1, 2010

(65) Prior Publication Data
US 2011/0002400 A1    Jan. 6, 2011

(30) Foreign Application Priority Data
Jul. 2, 2009 (IT) .............................. VA2009A0041

(51) Int. Cl.
*H04B 3/00* (2006.01)
(52) U.S. Cl.
USPC ............................ 375/257; 370/252; 375/219
(58) Field of Classification Search
USPC ...................... 375/257, 219, 267; 370/252
See application file for complete search history.

(56) References Cited

U.S. PATENT DOCUMENTS
5,828,293 A * 10/1998 Rickard ........................ 375/257

FOREIGN PATENT DOCUMENTS
EP    1499033    1/2005

OTHER PUBLICATIONS

Lasciandare et al., "Experimental field trails of a utility AMR power line communication system analyzing channel effects and error correction methods", IEEE, 2007, pp. 144-149.

* cited by examiner

*Primary Examiner* — Sam K Ahn
*Assistant Examiner* — Janice Tieu
(74) *Attorney, Agent, or Firm* — Allen, Dyer, Doppelt, Milbrath & Gilchrist, P.A.

(57) ABSTRACT

The method transmits a long packet of digital data over a poly-phase power line affected by impulsive noise synchronous with phase voltages. Instead of using very complicated coding schemes, starting from the knowledge of the typical power line scenario, useful information is transmitted where noise synchronous with the main signal is absent. Time-intervals of a known or estimated duration during which the poly-phase power line is affected by impulsive noise are determined, and dummy data during the time-intervals, and useful data during other time-intervals free from impulsive noise, are transmitted.

20 Claims, 5 Drawing Sheets

METHOD OF TRANSMITTING A PACKET OF DIGITAL DATA OVER A POLY-PHASE POWER LINE AFFECTED BY IMPULSIVE NOISE

FIELD OF THE INVENTION

The invention relates to methods of communications over power lines and, more particularly, to a method of transmitting a packet of digital data over a poly-phase power line affected by impulsive noise synchronous with the phase voltages.

BACKGROUND OF THE INVENTION

Power line communication (PLC) is an attractive technology that has received a lot of attention from the research community in the last years. Since power lines were not originally developed for communication purposes, power line communications generally take place in noisy environments that seriously affect the data transfer between two points of the PLC network. The literature has classified the noise present on the power line channel into two categories: asynchronous and synchronous with the alternating current (AC) power line. Synchronous noise is generated by devices having impulsive power absorption synchronous with the main voltage.

In the literature (e.g. see the article A. Lasciandare, S. Garotta, F. Veroni, E. Saccani, L. Guerrieri and D. Arrigo, "Experimental field trials of a utility AMR power line communication system analyzing channel effects and error correction methods," IEEE ISPLC 2007, pp. 144-149, March. 2007), the low voltage (LV) power line network, the last distribution level of the electric distribution line, has been considered and extensive measurements have been done in the ENEL simulated field with the aim to characterize the power line medium for automated meter reading (AMR) applications. In this framework, the power line channel was used for the communication between the data concentrator (acting as a master) and the electricity meters (the slaves). The results presented in the article pointed out that, at the considered frequencies, the most critical noise, which dominates over the other types of noise, is the synchronous noise. Synchronous noise generators include, but are not limited to, switched-mode power supplies (SMPS), lamp ballasts and power factor correction (PFC) units.

In FIG. 1, FIG. 2 and FIG. 3, the time relationship among phase 1 (continuous line), phase 2 (point-dotted line) and phase 3 (dotted line) of a 50 Hz three-phase system is shown together with the typical noise distributions highlighted in the above mentioned article. In particular, FIG. 1 features the case of a noise that is synchronous with phase 1; FIG. 2 and FIG. 3 consider the most detrimental cases of a noise synchronous with more than one phase voltage.

In FIG. 1, the noise is concentrated in correspondence with the peaks of the phase 1 sinusoidal wave and noise intensity is represented via a Gaussian distribution, which is typically observed in the applications addressed by the present invention. In FIG. 2, the noise is synchronous with phase 1 and phase 2. The noise pulses synchronous with the peaks of phase 1 have a greater intensity than noise pulses synchronous with phase 2, which are, however, significant. Clearly, the other situation in which the noise synchronous with the peaks of phase 2 is greater than the phase 1 synchronous noise is also possible. FIG. 3 illustrates an example of the worst case in which the noise is synchronous with all the three phases.

To obtain good communications in noisy conditions, generally redundancy is introduced at the transmitter side to protect the useful data information. A further protection, in particular against burst noise, is achieved by interleaving the useful data in transmission. If both coding and interleaving are employed, the receiver, via a de-interleaving, spreads the errors that have occurred in bursts and uses decoding to correct the isolated errors, thus considerably improving the robustness of the communication.

Nevertheless, very often coding and interleaving are not sufficient to obtain reasonable performances. In particular, in noisy conditions such as those reported in FIG. 1, FIG. 2 and FIG. 3 and, especially, if the noise is synchronous with more than one phase, the interleaver effectiveness diminishes because the maximum possible achievable error separation is strongly reduced. As a consequence, also the error correction capability of the code is not sufficient to handle the de-interleaved data to reconstruct the original transmitted information. Moreover, for applications like AMR, the requirements of very small chip sizes may not allow the use of the most powerful coding methods, like for instance turbo coding, because they may heavily impact on the whole chip area.

The skilled artisan will notice that figures similar to FIG. 1, FIG. 2 and FIG. 3 may be generated also for a 60 Hz three-phase system in use for example in the USA. Moreover, in FIG. 1, FIG. 2 and FIG. 3 a three-phase system, with the three phases mutually out of phase by $2\pi/3$ radians, is depicted. Clearly, similar situations may be represented also for other poly-phase systems like two-phase systems with the two phases out of phase by $\pi$ radians or for a single-phase system.

SUMMARY OF THE INVENTION

In view of the forgoing background it is desirable to provide a method of transmitting, over a poly-phase power line affected by impulsive noise synchronous with phase voltages, a long packet of data, e.g. a packet of data whose transmission takes longer than the interval between two consecutive noise pulses on the power line.

A method of transmitting in a very reliable manner a long packet of digital data over a poly-phase power line affected by impulsive noise synchronous with phase voltages has been found. Instead of using very complicated coding schemes, according to the present approach, starting from the knowledge of the typical power line scenario, useful information is transmitted where noise synchronous with the main signal is absent.

More precisely, time-intervals of a known or estimated duration during which the poly-phase power line is affected by impulsive noise are determined, and dummy data during the time-intervals, and useful data during other time-intervals free from impulsive noise, are transmitted.

According to an alternative embodiment of the present approach, during the time-intervals affected by impulsive noise, symbols with a larger repetition rate than during the other time-intervals are transmitted instead of dummy data. Corresponding methods of receiving useful data from packets of data are also disclosed.

DETAILED DESCRIPTION OF THE PREFERRED EMBODIMENTS

Figure 4:
FIG. 4 is a schematic diagram illustrating an exemplary structure of a transmitted packet of data.

The invention will be disclosed referring to a 50 Hz three-phase power line and to a communication system where the structure of the transmitted packet of data is as shown in FIG. 4, though the same considerations apply, with necessary changes, for a generic poly-phase power line in which the power voltage has a generic frequency and for packets of data organized according to a different structure.

Referring to FIG. 4, the useful data are preceded by the transmission of a preamble, a unique word (UW) and a transmission mode. The preamble and the UW fields are used by the receiver for synchronization purposes. For instance, the preamble is used for symbol synchronization and the UW is a particular pattern, which in general has good autocorrelation and cross-correlation properties, that is used for frame synchronization, that is for synchronizing the sequence of symbols that includes the useful part of the transmitted data. The transmission mode field includes the information that enables the receiver to identify which transmission mode has been adopted for the useful data field. The possible transmission modes that may be adopted are in general a combination of the chosen modulation and coding. Examples of possible modulations are frequency shift keying (FSK), phase shift keying of order M (M-PSK), differential PSK of order M (M-DPSK) or quadrature amplitude modulation (QAM). Examples of codes are block or convolutional codes, each of them possibly offering several code rates as available. For example, we may refer, without limiting the scope of the present invention, to a system adopting M-DPSK modulation with a rate ½ convolutional code and with the following 5 transmission modes: 2-DPSK un-coded, 4-DPSK un-coded, 8-DPSK un-coded, 2-DPSK coded, 4-DPSK coded.

The present approach will be referred to as the "anti synchronous noise" transmission mode. In the illustrative examples, a sixth mode, that is the novel transmission mode, will be added to the five just mentioned modes. In the illustrative examples this new mode will be based on the 2-DPSK coded modulation. We have chosen to base the sixth mode of the exemplary embodiments that follow on the 2-DPSK coded only because it is the more robust transmission mode among the adopted modes. The skilled artisan will understand that this choice does not constitute a limitation and that other strategies, for example motivated by throughput requirements, are possible.

Figure 5:
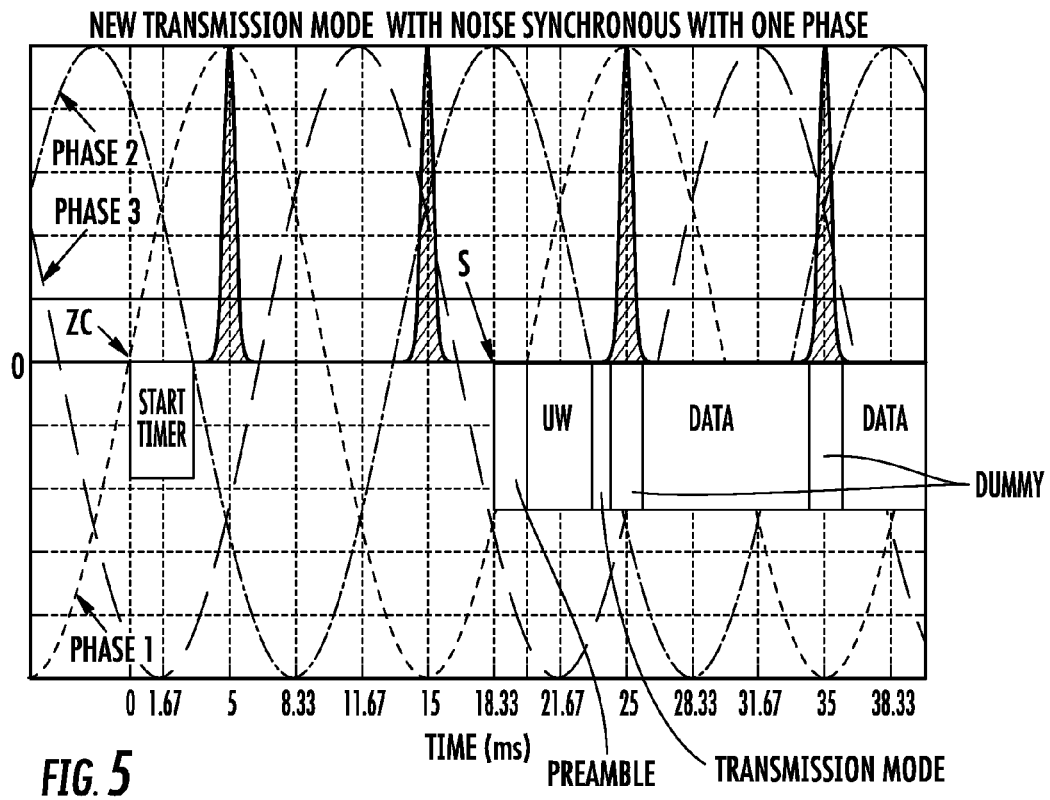
FIG. 5 is a timing diagram illustrating an embodiment of the present invention with noise synchronous with one phase voltage.

To better illustrate the concepts of the present invention, the preamble and the UW are assumed to last respectively 1/600 s=1.67 ms and 2/600 s=3.33 ms, while the transmission mode field lasts 0.5/600 s=0.83 ms. Moreover, a baud rate (BR) for the useful data field of 9600 M-DPSK symbols/s for all the transmission modes is assumed. In FIG. 5, an embodiment of the transmission is illustrated. The sinusoidal 50 Hz waveforms of phase 1, phase 2 and phase 3 and the noise synchronous with one phase (phase 1) are depicted. In FIG. 5 it is assumed, without limiting the scope of the present invention, that the transmission takes place on phase 1. The transmitter detects the zero-crossing point ZC of phase 1 corresponding to a phase 1 sinusoidal wave positive slope, which occurs in our exemplary figure at the time 0 s. Zero-crossing detection is a typical procedure in the transmission initialization, which is widely adopted and for instance standardized in the regulations "Distribution automation using distribution line carrier systems—Lower layer profiles—The spread frequency shift keying (S-FSK) profile," CEI/IEC 61334-5-1: 2001, pp. 18-19, though a crossing through any other level may be assumed as the instant of initialization of the transmission.

After zero-crossing detection, the transmitter starts a timer. The timer may be classically implemented by a clocked counter. Using the timer, the transmitter establishes a position S where the transmission may start and injects into the power line the preamble, the UW, the transmission mode and the useful data. If it is possible, S may be chosen so that the preamble, the UW and the transmission mode fields are transmitted in a zone free from synchronous noise.

According to the present approach, dummy symbols are transmitted in correspondence of synchronous noise bursts. In the considered example the dummy symbols are dummy 2-PSK symbols. Due to the timer, the transmitter knows where the peaks of phase 1 are located compared to the S position, since it knows where the S position is in respect to the zero-crossing ZC.

The just described procedure would be effective even when noise is synchronous with a phase different from the transmission phase: for instance, if the transmission takes place on phase 1 and the noise is synchronous with phase 2, the transmitter, by zero-crossing detection of phase 1, knows the position of the phase 1 peaks and, as a consequence, also the position of the phase 2 peaks and may choose the S position accordingly.

The duration D of the dummy field, or equivalently the number of dummy symbols N(D), is established for example on the basis of measurements or may be left programmable. In the considered example, the noise impulse is supposed to be effective for 1/600 s=1.67 ms. Considering the positive and negative 50 Hz peaks of phase 1, this value implies that ⅙ of the total AC line time is affected by the synchronous noise.

In the considered example, the transmitter injects after the transmission mode field P(S)=0 2-DPSK coded symbols of useful data. The P(S) coded symbols of useful data are followed by N(D)=16 dummy 2-PSK symbols because, since the symbol rate is 9600 baud, N(D)=BR·D=9600·1/600=16. These dummy symbols are followed by K(D)=BR·6/600−N(D)=80 2-DPSK coded symbols of useful data. The 80 2-DPSK coded symbols of useful data are again followed by 16 dummy 2-PSK symbols, which in turn are followed by other 80 2-DPSK coded symbols of useful data. This regular procedure of periodically alternating dummy symbols with useful data symbols terminates when all the symbols associated to the bits that compose the packet to be transmitted have been sent through the power line, after which the transmitter restarts the transmission procedure for the subsequent packet to be transmitted, starting from the zero-crossing detection.

In the illustrative example, the transmission mode field is immediately followed by the first dummy field. It is possible, however, that P(S)>0 data symbols be inserted between the transmission mode field and the first dummy field: for example, if the transmitter chooses S=10.5/600 s=17.5 ms, then it inserts P(S)=8 data symbols between the transmission mode field and the first dummy field. Note also that, in general, the function P(S) depends on the phase the noise is synchronous with, but, for the sake of clarity and since we suppose to know in advance which phase is the noisy phase, this dependence has not been made explicit.

Figure 1:
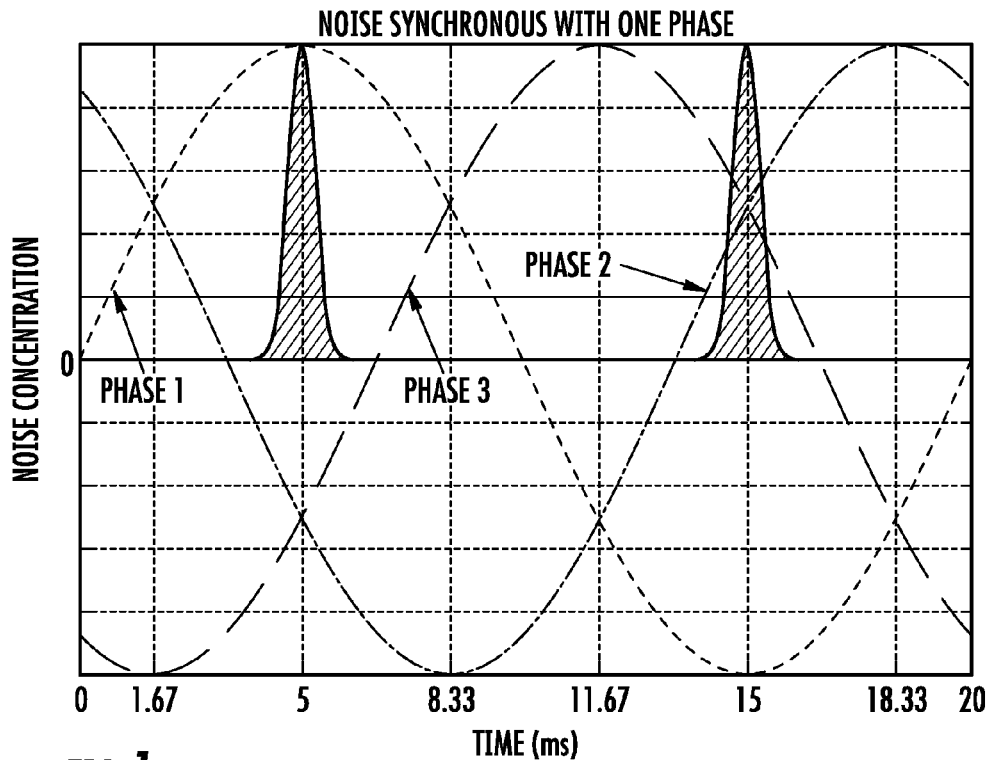
FIG. 1 is a timing diagram illustrating noise pulses synchronous with only one phase voltage of a three-phase power line.
Figure 2:
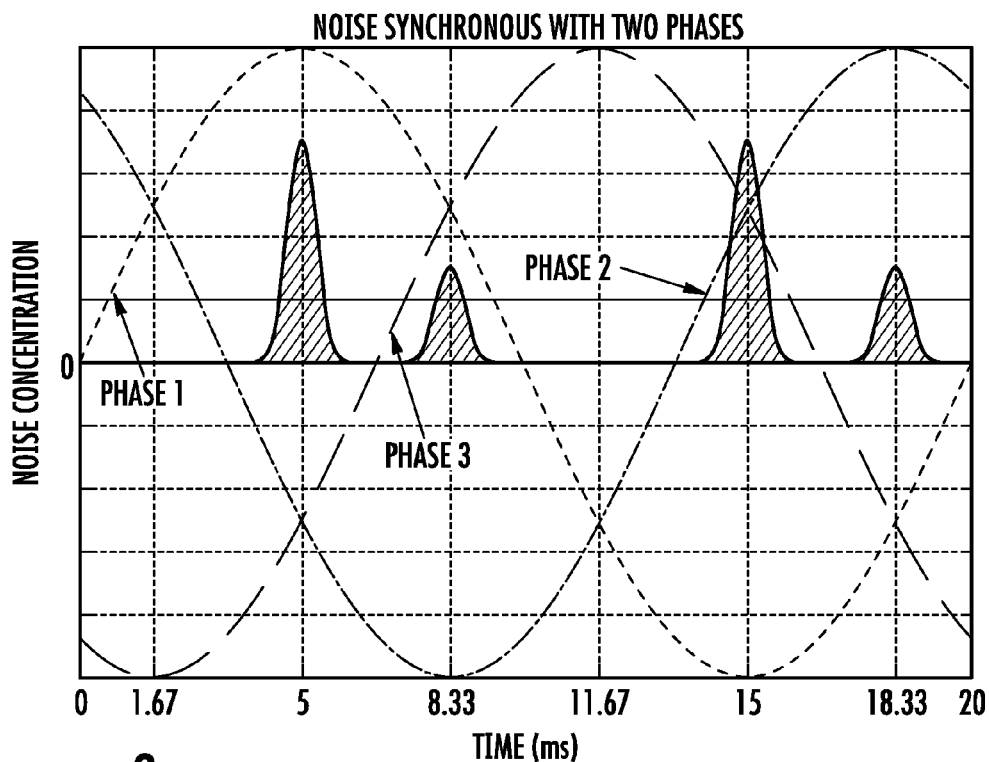
FIG. 2 is a timing diagram illustrating noise pulses synchronous with two phase voltages of a three-phase power line.
Figure 6:
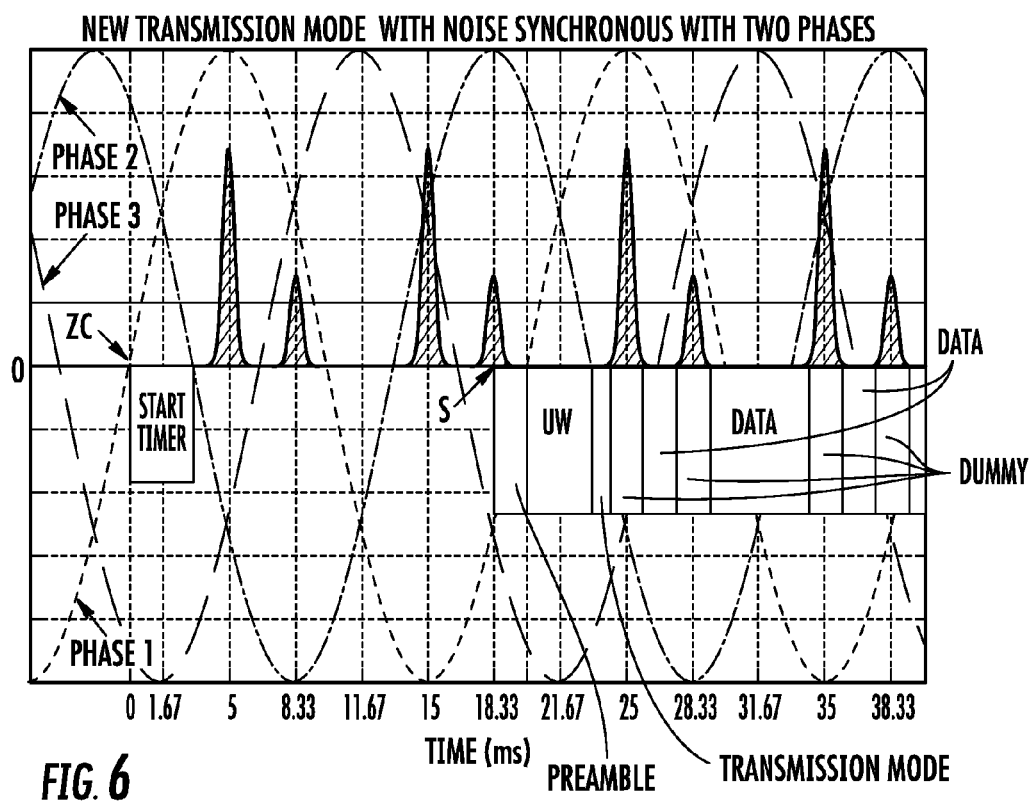
FIG. 6 is a timing diagram illustrating another embodiment of the present invention with noise synchronous with two phase voltages.

FIG. 6 illustrates the transmission according to another embodiment. The sinusoidal 50 Hz waveforms of phase 1, phase 2, phase 3 and the noise synchronous with two phases (phase 1 and phase 2) are depicted as in FIG. 2. In FIG. 6 it is assumed, without limiting the scope of the present invention, that the transmission takes place on phase 1. As in the case of a noise synchronous with one phase, the transmitter uses the zero-crossing detection (the point ZC in FIG. 6) and a timer to establish a position S where starting the transmission. If it is possible, S should be preferably chosen so that the preamble, the UW and the transmission mode fields are transmitted in a zone without synchronous noise. In the considered example, the maximum extent of a no noisy zone is 3/600 s=5 ms, while the preamble, the UW and the transmission mode field lasts 3.5/600 s=5.83 ms. Hence, at least 8 symbols (9600·0.5/600=8) should be transmitted in the synchronous noise zone. In FIG. 6, it has been chosen to accept deterioration on the first preamble 8 symbols that are transmitted where the noise synchronous with phase 2 is present. Clearly, other choices are possible and an example is reported in FIG. 7, where 16 UW symbols experience the noise synchronous with phase 1.

Returning to FIG. 6, the preamble is followed by the UW and the transmission mode fields. According to an embodiment of the present invention, the transmitter injects dummy symbols in correspondence of the noise bursts associated to both phase 1 and phase 2 voltage peaks preceded by P(S) symbols of useful data. In the considered example P(S)=0.

In FIG. 6 the durations $D_1$ and $D_2$ of the dummy fields are the same for both phase 1 and phase 2 synchronous noises and equal to 1/600 s=1.67 ms. The skilled artisan will understand that the present invention is not limited to this particular situation and that two different dummy field durations $D_1$ and $D_2$ may be also used. However, for the sake of clarity a single duration D has been used: this choice (with the conservative equation $D=\max(D_1,D_2)$) may turn out to be easier to implement. After the transmission mode field and P(S) dummy symbols, the transmitter sends a sequence of $N(D_1)$ dummy symbols, $K(D_1,D_2)$ data symbols, $N(D_2)$ dummy symbols, $K(D_2,D_1)$ data symbols: this way of alternating data symbols and dummy symbols is maintained until all the symbols associated to the packet to be transmitted are sent.

In the considered example $N(D_1)=BR \cdot D_1=16$ dummy symbols, $N(D_2)=BR \cdot D_2=16$ dummy symbols. To center the dummy fields onto the synchronous noise, $K(D_1,D_2)=BR \cdot 2/600-N(D_2)/2=16$ data symbols and $K(D_2,D_1)=BR \cdot 4/600-N(D_2)/2-N(D_1)/2=48$ data symbols. Hence, after the transmission mode field the transmitter sends a sequence of 16 dummy 2-PSK symbols, 16 data 2-DPSK coded symbols, 16 dummy 2-PSK symbols, 48 data 2-DPSK coded symbols: this way of alternating data symbols and dummy symbols is maintained until all the symbols associated to the packet to be transmitted are sent. Then the transmission of a new packet may start with the zero-crossing detection.

Figure 7:
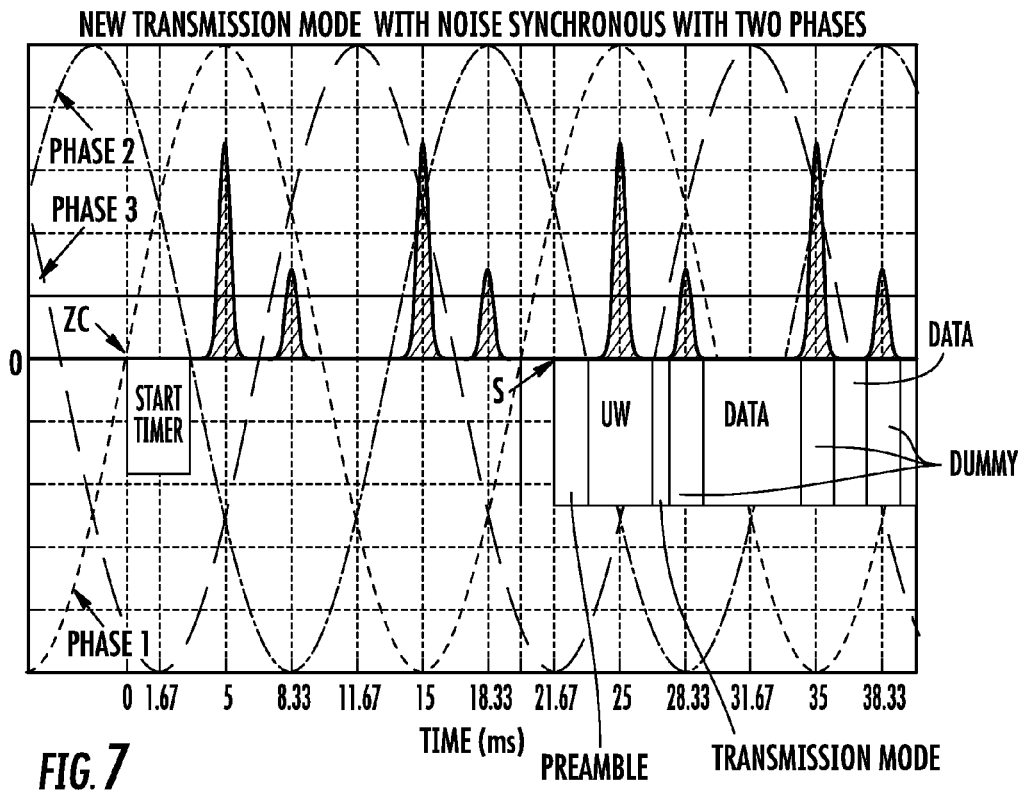
FIG. 7 is a timing diagram illustrating another embodiment of the present invention with noise synchronous with two phase voltages.

In the other illustrative example of FIG. 7, after the transmission mode field, P(S)=0 bits are followed by $N(D_2)=16$ dummy 2-PSK symbols, $K(D_2,D_1)=48$ 2-DPSK coded data symbols, $N(D_1)=16$ 2-PSK dummy symbols, $K(D_1,D_2)=16$ 2-DPSK coded data symbols and again this method of alternating dummy and data symbols is kept until all the symbols associated to the packet to be transmitted are sent.

Figure 3:
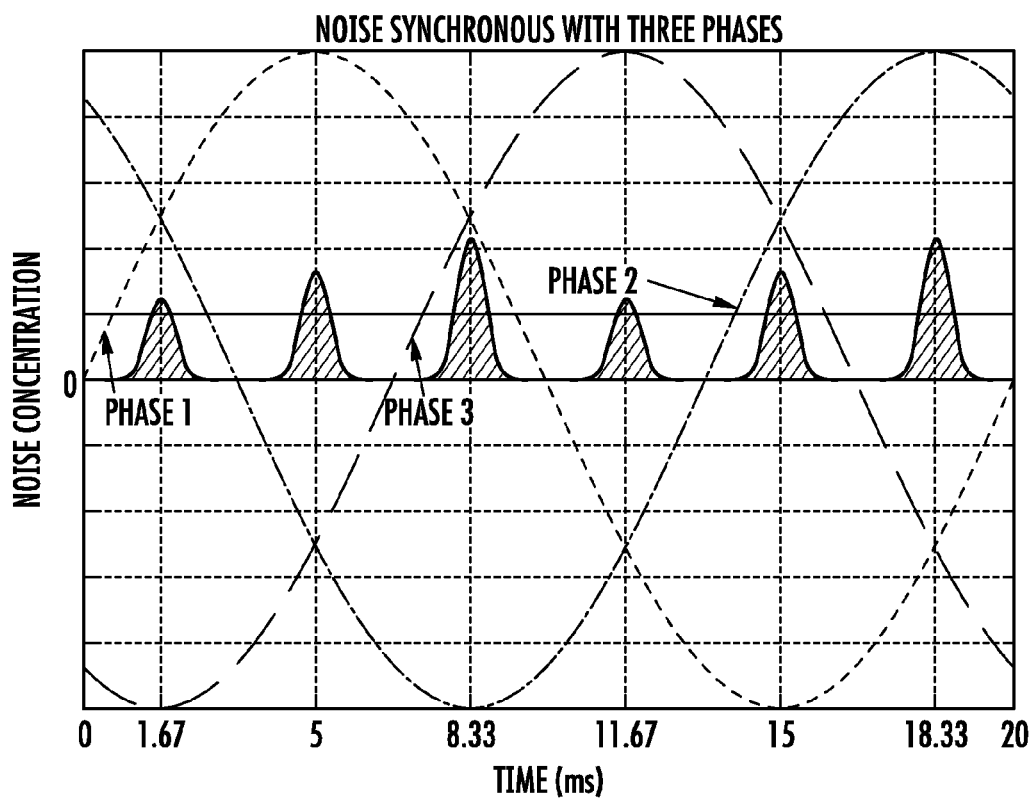
FIG. 3 is a timing diagram illustrating noise pulses synchronous with all the three phase voltages of a three-phase power line.
Figure 8:
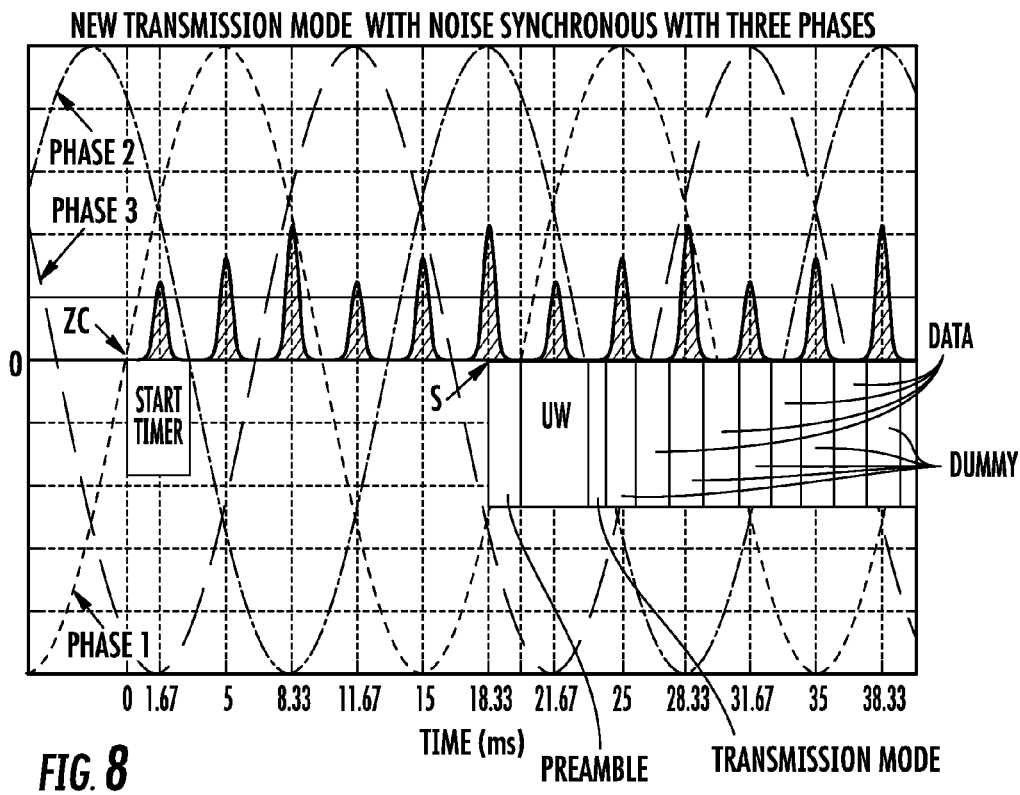
FIG. 8 is a timing diagram illustrating another embodiment of the present invention with noise synchronous with the three phase voltages.

In FIG. 8, the transmission according to yet another embodiment is shown. The sinusoidal 50 Hz waveforms of phase 1, phase 2, phase 3 and the noise synchronous with three phases are depicted as in FIG. 3. In FIG. 8, without limiting the scope of the present invention, it is assumed that the transmission takes place on phase 1. As in the description of the first and second embodiments, the transmitter uses the zero-crossing detection to establish the position S at which the communication is started. If it is possible, it may select S so that the preamble, the UW and the transmission mode are transmitted in a no synchronous noise zone. Otherwise, S may be chosen to minimize the impact of the synchronous noise on said fields. In the example of FIG. 8, the effective durations $D_1$, $D_2$ and $D_3$ of the noise events have been supposed to be the same for all the three phases and equal to 1/600 s=1.67 ms. As a consequence, since the distance of two consecutive sinusoidal peaks is 2/600 s=3.33 ms, the noise free time is 2/600-1/600=1/600 s=1.67 ms. In FIG. 8, it has been chosen to start the transmission at S=11/600 s=18.33 ms. In this way, half of the preamble, half of the UW and the entire transmission mode are transmitted in a good zone.

According to the present approach, the transmitter injects dummy symbols in correspondence to the noise bursts associated to phase 1, phase 2 and phase 3 sine peaks preceded by P(S) symbols of useful data. In the considered example, after the transmission mode P(S)=0 data symbols are transmitted. Then a sequence of $N(D_1)=BR \cdot D_3$ dummy symbols, $K(D_1,D_2)$ data symbols, $N(D_2)=BR \cdot D_2$ dummy symbols, $K(D_2,D_3)$ data symbols, $N(D_3)=BR \cdot D_3$ dummy symbols, $K(D_3,D_1)$ data symbols is transmitted and this way of alternating dummy symbols with data symbols is kept until all the symbols associated to the transmit packet have been sent. A choice for the $K(D_i, D_m)$ length of the data symbols fields allowing to center the dummy field onto the noise events is $K(D_i,D_m)=BR \cdot 2/600-N(D_i)/2-N(D_m)/2$ for all i=1, 2, 3 and m=i+1−3*floor(i/3) being floor(a) the integer part of a. In the illustrative example, $N(D_i)=16$ for all i=1, 2, 3 and $K(D_i,D_m)=16$ for all i=1, 2, 3 and m=i+1−3*floor(i/3). Hence, 16 dummy 2-PSK symbols are followed by 16 data 2-DPSK coded symbols which in turn are followed by 16 2-PSK dummy symbols and so on.

Figure 9:
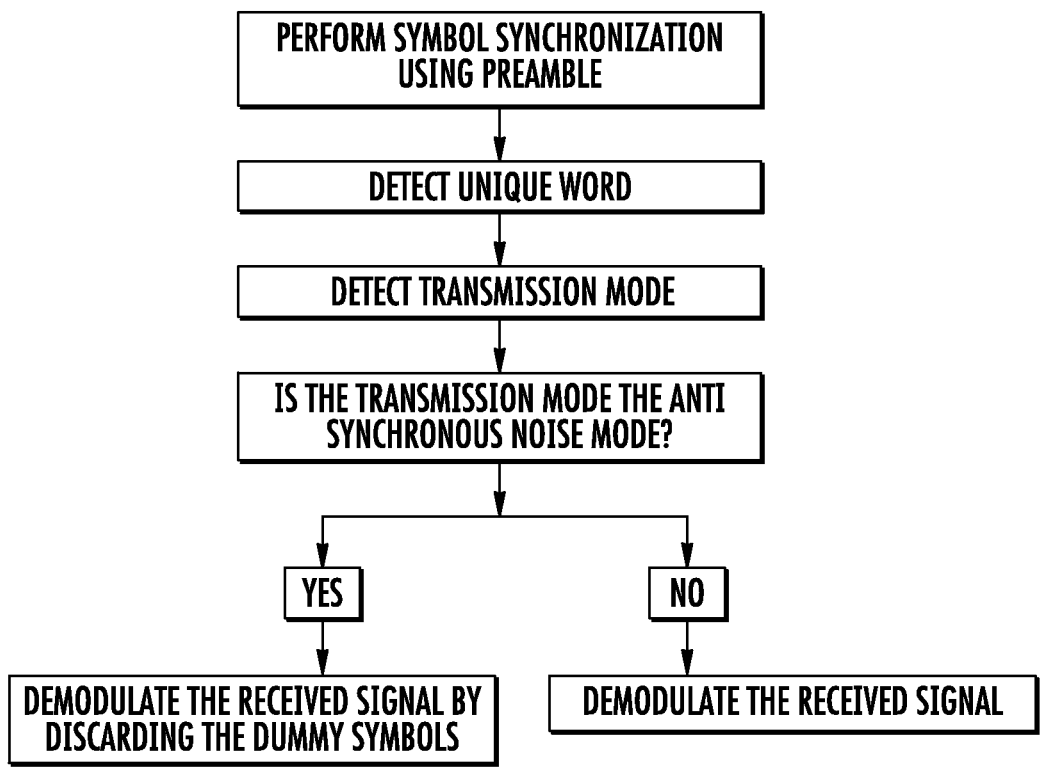
FIG. 9 is a flow chart illustrating operations carried out at the receiver side in accordance with features of the present invention.

In FIG. 9, the flow of a communication receiver in the context of the invention is illustrated. The flow is applied after the received signal has been elaborated by an analog front end (AFE) that includes, among other blocks, an amplifier to adjust the dynamic of the signal and an analog to digital converter (ADC). The flow is characterized by the following steps: i) the preamble reception is used to realize symbol synchronization; ii) the UW detection is used to obtain frame synchronization. If the UW is not found, the receiver continues to wait for the UW until eventually it detects it or a time-out signal is generated; iii) after frame synchronization is declared, the receiver detects the transmission mode.

In the considered example, if the detected transmission mode is, for instance, the 4-DPSK coded mode, the receiver uses a differential demodulator to differentially demodulate the 4-DPSK symbols and sends the differential demodulator output to a soft-input soft-output (SISO) de-mapper that produces log-likelihood ratios (LLRs) that are de-interleaved (if interleaving is present in transmission) and soft-input Viterbi (but other decoding methods are also possible) decoded to reconstruct the transmitted bits. If the transmission mode is the anti synchronous noise mode, the demodulation of the received signal proceeds as usual using the transmission mode which was in advance selected as the base for the anti synchronous noise mode (in the considered example the 2-DPSK coded mode), discarding from the received symbols, the dummy 2-PSK symbols.

Referring to the first embodiment, with the transmission as in FIG. 5, choosing the symbols to be discarded is straightforward, provided the receiver and the transmitter share the following information: a) the number of useful data symbols P(S) that are transmitted between the transmission mode field and the first dummy field; b) the duration D of the dummy field or equivalently, the number of dummy symbols N(D) that are periodically transmitted. In the illustrative example, the receiver knows that P(S)=0 and that N(D)=16. The receiver already knows the distance between two AC-line peaks of the same phase, in the considered example 6/600 s=10 ms. Because even the baud rate is known, the receiver also knows the number of symbols that the transmitter has injected on the power line channel in the time slot between two consecutive peaks related to the same phase of the AC-line.

In the considered example this number is $9600 \cdot 10^{-2}=96$ symbols. As a consequence, from N(D)=16, the receiver may also deduce the number of useful symbols between two consecutive dummy fields. In the considered example this number is K(D)=96−N(D)=96−16=80. Hence, after the receiver detects the transmitted mode as the anti synchronous noise mode, it knows that P(S)=0 useful symbols are transmitted before the first dummy field. As a consequence it proceeds to discard the successive N(D)=16 dummy 2-PSK symbols and demodulates the successive K(D)=80 2-DPSK coded symbols. Then it discards again N(D)=16 dummy 2-PSK symbols and demodulates the successive K(D)=80 2-DPSK coded symbols and this regular procedure terminates only when the transmitted packet has been entirely received.

As another illustrative example, suppose that the S position is at S=10.5/600 s=17.5 ms with the same dummy field duration D=1/600 s, thus implying that P(S)=8 and N(D)=16 symbols. In this case, the receiver, after detecting that the transmission mode is the anti synchronous noise mode, demodulates the first P(S)=8 symbols, then it discards the successive P(S)=16 symbols, demodulates the successive K(D)=80 symbols and so on as in the first example. Note that all the reasoning just done does not depend on the phase on which the reception takes place.

Referring to the second embodiment, with the transmission as in FIG. 6, choosing the symbols to be discarded is easy provided the receiver and the transmitter share the following information: a) the number of useful data symbols P(S) that are transmitted between the transmission mode field and the first dummy field; b) the durations $D_1$ and $D_2$ of the dummy fields or equivalently the number of dummy symbols $N(D_1)$ and $N(D_2)$ that are periodically transmitted; c) which dummy field, $N(D_1)$ or $N(D_2)$, is transmitted after the P(S) symbols. The information c) is important even when $N(D_1)=N(D_2)$.

In the illustrative example with the transmission as in FIG. 6, P(S)=0, $N(D_1)$=16 and $N(D_2)$=16. Moreover, after P(S) it is the $N(D_1)$ field that has been transmitted. As a consequence, the receiver demodulates P(S)=0 data symbols and discards $N(D_1)$=16 dummy symbols. After discarding the $N(D_1)$ dummy symbols, since the receiver knows that the distance between a phase 1 peak and the phase 2 successive peak is 2/600 s=3.33 ms corresponding to 9600·2/600=32 modulation symbols, it demodulates $K(D_1,D_2)=32-N(D_1)/2-N(D_2)/2=16$ data symbols. After demodulating the 16 data symbols, the receiver discards $N(D_2)$=16 dummy symbols.

After discarding the $N(D_2)$ dummy symbols, since the receiver knows that the distance between a phase 2 peak and the phase 1 successive peak is 4/600 s=6.66 ms corresponding to 9600·4/600=64 modulation symbols, it demodulates $K(D_2,D_1)=64-N(D_2)/2-N(D_1)/2=48$ data symbols. After demodulating the 48 data symbols, the receiver discards $N(D_1)$ dummy symbols and the procedure continues until all the data symbols associated to the transmitted packet are demodulated. After the demodulation of the P(S) symbols, the procedure substantially includes: discarding $N(D_1)$ dummy symbols, demodulating $K(D_1,D_2)$ data symbols, discarding $N(D_2)$ dummy symbols, demodulating $K(D_2,D_1)$ data symbols, discarding $N(D_1)$ dummy symbols, etc.

In the other illustrative example of FIG. 7, P(S)=0, $N(D_1)$=16 and $N(D_2)$=16. Moreover, after P(S) it is the $N(D_2)$ field that has been transmitted. As a consequence, the receiver demodulates P(S)=0 data symbols and discards $N(D_2)$=16 dummy symbols. After discarding the $N(D_2)$ dummy symbols, since the receiver knows that the distance between a phase 2 peak and the phase 1 successive peak is 4/600 s=6.66 ms corresponding to 64 modulation symbols, it demodulates $K(D_2,D_1)=64-N(D_2)/2-N(D_1)/2=48$ data symbols. After demodulating the 48 data symbols, the receiver discards $N(D_1)$=16 dummy symbols. After discarding the $N(D_1)$ symbols, since the receiver a priori knows that the distance between a phase 1 peak and the phase 2 successive peak is 2/600 s=3.33 ms corresponding to 32 modulation symbols, it demodulates $K(D_1,D_2)=32-N(D_1)/2-N(D_2)/2=16$ data symbols. After demodulating the 16 data symbols, the receiver discards $N(D_2)$ dummy symbols and the procedure periodically continues until all the data symbols associated to the transmitted packet are received.

Referring to yet another embodiment, with transmission as in FIG. 8, choosing the symbols to be discarded is relatively simple, provided the receiver and the transmitter share the following information: a) the number of useful data symbols P(S) that are transmitted between the transmission mode field and the first dummy field; b) the durations $D_1$, $D_2$ and $D_3$ of the dummy fields or equivalently the number of dummy symbols $N(D_1)$, $N(D_2)$ and $N(D_3)$ that are periodically transmitted; c) which dummy field, $N(D_1)$ or $N(D_2)$ or $N(D_3)$, is transmitted after the P(S) data symbols. In the illustrative example, with the transmission as in FIG. 8, P(S)=0, $N(D_1)$=16, $N(D_2)$=16 and $N(D_3)$=16. Moreover, after P(S) it is the $N(D_1)$ field that has been transmitted. As a consequence, the receiver demodulates P(S)=0 symbols and discards $N(D_1)$=16 dummy symbols.

After discarding the $N(D_1)$ dummy symbols, since the receiver knows that the distance between a phase 1 sinusoidal peak and the successive phase 2 sinusoidal peak is 2/600 s=3.33 ms corresponding to 9600·2/600=32 modulation symbols, it demodulates $K(D_1,D_2)=32-N(D_1)/2-N(D_2)/2=16$ data symbols. After demodulating the $K(D_1,D_2)$ data symbols, the receiver discards $N(D_2)$=16 dummy symbols. After discarding the $N(D_2)$ dummy symbols, since the receiver knows that the distance between a phase 2 sinusoidal peak and the successive phase 3 sinusoidal peak is 2/600 s=3.33 ms corresponding to 9600·2/600=32 modulation symbols, it demodulates $K(D_2,D_3)=32-N(D_2)/2-N(D_3)/2=16$ data symbols. After demodulating the $K(D_2,D_3)$ data symbols, the receiver discards $N(D_3)$=16 dummy symbols. After discarding the $N(D_3)$ dummy symbols, since the receiver a priori knows that the distance between a phase 3 sinusoidal peak and the successive phase 1 sinusoidal peak is 2/600 s=3.33 ms corresponding to 9600·2/600=32 modulation symbols, it demodulates $K(D_3,D_1)=32-N(D_3)/2-N(D_1)/2=16$ data symbols.

After demodulating the $K(D_3,D_1)$ data symbols, the receiver discards $N(D_1)$ dummy symbols and the procedure periodically continues until all the data symbols associated to the transmitted packet are received. The parameters chosen in the just described example allow a very regular algorithm: discarding 16 dummy 2-PSK symbols, demodulating 16 2-DPSK coded data symbols, discarding 16 dummy 2-PSK symbols, demodulating 16 2-DPSK coded data symbols, etc. The chosen parameters permit also to avoid sharing the information c).

In all the embodiments of the present invention, the terms $N(D_i)$ are integer numbers since they represent the number of dummy symbols to be transmitted: however, the product $BR·D_i$ by which $N(D_i)$ is obtained is not necessarily an integer as in the illustrative examples. This difficulty may be easily overcome: the straightforward approach includes, for example, ceiling the product $BR·D_i$.

As a further observation, the second embodiment may be adopted even for the cases in which the noise is synchronous with only one phase: for example this may be useful when there is no knowledge about the power line channel between two communication nodes or in a hybrid situation in which the noise is sometimes synchronous with one phase of the AC-line and sometimes with two. With similar motivations, the third embodiment may be adopted even for the cases in which the noise is synchronous with one or with two phases.

Moreover, in all the embodiments the transmission start point S may be varied from a packet to the successive without changing the receiver once the P(S), N(D) (or $N(D_i)$ when the noise synchronous with more than one phase is present; in this case it is also important to know which $N(D_i)$ follows the P(S) field as already noted) values are known. Clearly the allowed variations of S should be preferably determined to transmit dummy symbols in correspondence to the noisy zones.

An alternative to the transmission of dummy symbols may be the transmission of a very strongly protected data symbols field in the synchronous noise zone. For instance, in the illustrative example of the third embodiment, instead of 16 dummy symbols, a repetition code with code rate 1/16 may be used, i.e. the same 2-PSK data symbol is repeated 16 times. The skilled artisan will observe, however, that such an approach implies the need of implementing an extra decoding mechanism at the receiver side which may be undesirable if the throughput advantages obtained with the transmission of the strongly protected data symbols are modest.

Several variants are possible. For example, in a first variation the sequence of N(D) (or $N(D_i)$ when the noise is synchronous with more than one phase) dummy symbols are not transmitted symmetrically compared to the peaks of the AC-line phase in which the noise concentrates: this may be motivated by the fact that the noise distribution is itself not symmetrical. As the skilled artisan will note, sharing the knowledge of the P(S) and N(D) (or $N(D_i)$ when the noise is synchronous with more than one phase; in these cases it may be also important to share which $N(D_i)$ follows the P(S) field) parameters between the transmitter and the receiver is again sufficient to achieve effective communication. For instance, a method that implies asymmetry includes fixing P(S)=P and varying the S position using the granularity of the timer (in the considered example a good choice in this direction may involve using a counter for the timer clocked with a step of tenth of μs).

According to another variant, the P(S) and the N(D) parameters (or $N(D_i)$ when the noise is synchronous with more than one phase; in these cases it may be also important to share which $N(D_i)$ follows the P(S) field) are not shared between the transmitter and the receiver: the transmitter may dedicate an auxiliary field successive to the transmission mode detection field to inform the receiver about these parameters (and eventually which $N(D_i)$ follows the P(S) field). At the receiver side, this field may be taken into consideration only when the anti synchronous noise mode is detected, otherwise it is ignored.

According to yet another variant, the transmitter introduces dummy symbols also into the field which was the union of the preamble, the UW and the transmission mode field. In this variant, the receiver should act accordingly and discard the dummy symbols even in the packet part that precedes the useful data. In this case the receiver should know in advance, besides the P(S) and N(D) parameters (or the $N(D_i)$ parameters together with the information of which $N(D_i)$ follows the P(S) field), also how the dummy symbols are inserted in the part.

That which is claimed is:

1. A method of transmitting a packet of data over a poly-phase power line affected by impulsive noise synchronous with at least one phase voltage of the poly-phase power line, to be received by a receiver connected to the power line, the transmission of packet data lasting longer than the interval between two consecutive noise pulses on the power line, the method comprising:
identifying noise time-intervals of a duration during which the poly-phase power line is affected by the impulsive noise; and
transmitting dummy data during the identified noise time-intervals, and useful data during other time-intervals that are not affected by the impulsive noise.

2. The method of claim 1, wherein the impulsive noise is synchronous with voltage peaks of the phase voltages.

3. The method of claim 2, wherein identifying the noise time-intervals comprises:
detecting a zero-cross event of one of the phase voltages; and
estimating instants of occurrence of voltage peaks of one or more of the phase voltages with which the impulsive noise is synchronous from the zero-cross event;
the noise time-intervals including the estimated instants of occurrence of the voltage peaks.

4. The method of claim 1, wherein transmitting includes:
transmitting a first group of data of a preamble portion and of a unique word for synchronizing a receiver;
transmitting a second group of data for identification of a transmission mode; and
transmitting a third group of useful information data and of dummy data.

5. The method of claim 4, wherein the groups of data are transmitted so that the transmission of the first and second groups of data are in the other time-intervals that are not affected by the impulsive noise.

6. The method of claim 4, further comprising transmitting, after the second group of data and before the third group of data, an auxiliary group of data for communicating to a receiver a number of useful information data that are transmitted between the second group of data and the dummy data, a number of dummy data that are periodically transmitted, and how the dummy data are interleaved with the useful information data.

7. A method of receiving useful data from a packet of data transmitted over a poly-phase power line affected by impulsive noise synchronous with at least a phase voltage of the poly-phase power line, the transmission of the packet of data lasting longer than the interval between two consecutive noise pulses on the power line, dummy data being transmitted during identified noise time-intervals, and useful data being transmitted during other time-intervals that are not affected by the impulsive noise, the method comprising:

at a receiver, identifying locations of dummy data and of useful data in the packet of data; and at the receiver, extracting useful data by discarding data at the identified locations of dummy data.

8. The method of claim 7, wherein the transmitted data include a first group of data of a preamble portion and of a unique word for synchronizing the receiver, a second group of data for identification of a transmission mode, and a third group of useful information data and of dummy data; wherein identifying locations of dummy data and of useful data is based on:

a number of useful information data that are transmitted between the second group of data and the dummy data; and a number of dummy data that are periodically transmitted and how groups of dummy data are interleaved with groups of useful information data.

9. The method of claim 8, wherein the transmitted data further comprises after the second group of data and before the third group of data, an auxiliary group of data for communicating to the receiver a number of useful information data that are transmitted between the second group of data and the dummy data, a number of dummy data that are periodically transmitted, and how the dummy data are interleaved with the useful information data; and wherein the auxiliary group of data is used in identifying the number of useful information data that are transmitted between the second group of data and the dummy data and in identifying the number of dummy data and how groups of dummy data are interleaved with groups of useful information data.

10. The method of claim 8, further comprising:

identifying the transmission mode based upon the second group of data;

identifying locations of dummy data and of useful data, and extracting useful data by discarding data at the identified locations of dummy data when the transmission mode identified in the second group of data indicates the use of dummy data; and extracting useful information data without discarding data when the transmission mode identified in the second group of data does not indicate the use of dummy data.

11. A communication device for transmitting a packet of data over a poly-phase power line affected by impulsive noise synchronous with at least a phase voltage of the poly-phase power line, to be received by a receiver connected to the power line, the transmission of the packet of data lasting longer than the interval between two consecutive noise pulses on the power line, the device comprising:

a power line interface; and a data transmitter coupled to the power line interface and configured to identify noise time-intervals of a duration during which the poly-phase power line is affected by the impulsive noise, and to transmit dummy data during the identified noise time-intervals, and useful data during other time-intervals that are not affected by the impulsive noise.

12. The communication device of claim 11, wherein the impulsive noise is synchronous with voltage peaks of the phase voltages.

13. The communication device of claim 12, wherein the transmitter is configured to identify the noise time-intervals by detecting a zero-cross event of one of the phase voltages, and estimating instants of occurrence of voltage peaks of one or more of the phase voltages with which the impulsive noise is synchronous from the zero-cross event; wherein the noise time-intervals include the estimated instants of occurrence of the voltage peaks.

14. The communication device of claim 11, wherein the data transmitter is configured to transmit:

a first group of data of a preamble portion and of a unique word for synchronizing a receiver;

a second group of data for identification of a transmission mode; and a third group of useful information data and of dummy data.

15. The communication device of claim 14, wherein the groups of data are transmitted so that the transmission of the first and second groups of data are in the other time-intervals that are not affected by the impulsive noise.

16. The communication device of claim 14, wherein the transmitter is further configured to transmit, after the second group of data and before the third group of data, an auxiliary group of data for communicating to the receiver a number of useful information data that are transmitted between the second group of data and the dummy data, a number of dummy data that are periodically transmitted, and how the dummy data are interleaved with the useful information data.

17. A communication device for receiving a packet of data over a poly-phase power line affected by impulsive noise synchronous with at least one phase voltage of the poly-phase power line, the transmission of the packet of data lasting longer than the interval between two consecutive noise pulses on the power line, dummy data being transmitted during identified noise time-intervals, and useful data being transmitted during other time-intervals that are not affected by the impulsive noise, the device comprising:

a power line interface; and a data receiver coupled to the power line interface and configured to identify locations of dummy data and of useful data in the packet of data, and extract useful data by discarding data at the identified locations of dummy data.

18. The communication device of claim 17, wherein the transmitted data include a first group of data of a preamble portion and of a unique word for synchronizing the receiver, a second group of data for identification of a transmission mode, and a third group of useful information data and of dummy data; wherein the data receiver is configured to identify locations of dummy data and of useful data by using:

a number of useful information data that are transmitted between the second group of data and the dummy data; and a number of dummy data that are periodically transmitted and how groups of dummy data are interleaved with groups of useful information data.

19. The communication device of claim 18, wherein the transmitted data further comprises after the second group of data and before the third group of data, an auxiliary group of data for communicating a number of useful information data that are transmitted between the second group of data and the dummy data, a number of dummy data that are periodically transmitted, and how the dummy data are interleaved with the useful information data; and wherein the data receiver is configured to use the auxiliary group of data in identifying the number of useful information data that are transmitted between the second group of data and the dummy data and in identifying the number of dummy data and how groups of dummy data are interleaved with groups of useful information data.

20. The communication device of claim 18, wherein the data receiver is further configured to:
- identify the transmission mode based upon the second group of data;
- identify locations of dummy data and of useful data, and extracting useful data by discarding data at the identified locations of dummy data when the transmission mode identified in the second group of data indicates the use of dummy data; and
- extract useful information data without discarding data when the transmission mode identified in the second group of data does not indicate the use of dummy data.

\* \* \* \* \*